United States Patent Office 3,705,212
Patented Dec. 5, 1972

3,705,212
PHOSPHONYLCARBAMYLOXY-PHOSPHONATES
Henry Martin, Gellertstrasse 24, and Jozef Drabek,
Herrengrabenweg 14, both of Basel, Switzerland
No Drawing. Filed Aug. 6, 1970, Ser. No. 61,819
Claims priority, application Switzerland, Aug. 11, 1969,
12,130/69
Int. Cl. C07f 9/38; A01n 9/36
U.S. Cl. 260—926  6 Claims

ABSTRACT OF THE DISCLOSURE 2,2,2-trihalo - 1 - [O,O - dialkylphosphonylcarbamoyloxy]-ethylphosphonic acid ester are very effective substances for combating insects, nematodes, members of the order Acarina and plant-pathogenic bacteria and fungi. They may be applied in the form of pesticidal preparations.

---

This invention relates to phosphonic acid esters and to a process for their manufacture.

The present invention provides phosphonic acid esters of the general formula $$\begin{array}{c} R_1O \\ \phantom{R_2O}\diagdown \\ \phantom{R_2O}P-CH-C(Y)_3 \quad OR_3 \\ R_2O\diagup \phantom{|}\|\phantom{|} \phantom{|}|\phantom{xx}\diagup \\ \phantom{R_2Oxx}O \phantom{x}O-C-NH-P \\ \phantom{R_2Oxxxxxxxx}\|\phantom{xxx}\|\diagdown \\ \phantom{R_2Oxxxxxxxx}O \phantom{xxx}O\phantom{x}OR_4 \end{array} \quad (I)$$

wherein $R_1$, $R_2$, $R_3$ and $R_4$, which may be the same or different, each represents an alkyl radical containing from 1 to 5 carbon atoms, X represents an oxygen or sulphur atom and Y represents a halogen atom, especially a fluorine, chlorine or bromine atom.

The phosphonic acid esters of Formula I are active against various pests of the animal and vegetable kingdom.

Those compounds in which $R_1$, $R_2$, $R_3$ and $R_4$ independently of one another denote a methyl or ethyl group, X represents an oxygen or sulphur atom and Y represents a chlorine or bromine atom, are preferred. Of these, those active substances in which $R_1$ is the same as $R_2$ or $R_3$ is the same as $R_4$, are particularly important.

The new compounds are active against all stages of development of insects and representatives of the order Acarina, for example against sucking and biting insects.

The sucking insects include, for example, Diptera and Hymenoptera, for example aphids (Aphidae) such as *Myzus persicae, Doralis fabae, Rhopalosiphum padi, Macrosiphum pisi, Macrosiphum solanifolii, Cryptomyzus korschelti, Sappaphis mali, Hyalopterus arundinis, Myzus cerasi*, and scale lice and woolly lice (Coccina) for example *Aspidioutus hederae, Lecanium hesperidum, Pseudococcus maritimus*, varieties of Thrips (Thysanoptera), for example *Hercinothrips femoralis*, bugs, for example *Piesma quadrata, Rhodnius prolixus, Triatoma infestans*, and cicadas, for example *Euscelis bilobatus* or *Nephotettix bipunctatus*.

Amongst the biting insects there may be mentioned, for example, Lepidoptera and Coleoptera, for example *Plutella maculipennis, Lymantria dispar, Euproctis chrysorrhoea, Malocosoma neustria, Mamestra brassicae, Agrotis segetum, Pieris brassicae*, and also *Prodenia litura, Ephestia kuhniella, Galleria, mellonella*, and storage pests such as *Dermestes frischii, Trogoderma granarius, Tribolium castaneum*, Calandra and *Sitophilus zea mais, Stegobium paniceum, Tenebrio molitor, Oryzaephilus surinamensis, Blattela germanica, Periplaneta americana, Blatta orientalis, Blaberus gigantus, Blaberus fuscus, Gryllus domesticus, Sitophilus granarius* and *Leptinotarsa decemlineata;* varieties which live in the ground such as *Agriotes* sp., *Melolontha melolontha;* and termites such as *Leucotermes reticulitermes* sp. and *Leucotermes flavipes*.

A large number of pests is to be found under the order Acarina, for example, mites and amongst these especially spider mites (Tetranychidae) such as *Tetranychus telarius, T. althaeae, T. urticae, Paratetranychus pilosus, Panonychus ulmi*, and gall mites (*Eriophyes ribis*) and tarsonemides such as *Hemitarsonemus latus* or *Tarsonemus pallidus*.

The order Acarina, however, also includes, for example, the ticks, that is to say ectoparasites such as *Boophilus microplus, Dermanyssus gallinae, Ornithonyssus bacoti, Ornithonyssus sylviarum, Rhipicephalus bursa, Pneumonyssus caninum, Laelaps nutalli, Acarapis woodi* and *Psorergates ovis*.

The phosphonic acid esters according to the present invention exert a strong action against insects and Acarina which are known to be pests in cultures of crop plants. For example, the rice stem borer, *Chilo suppressalis*, is completely destroyed by an amount of active substance of 0.02%.

Apart from the insecticidal and acaricidal action, the active substances of Formula I are also active against plant-pathogenic bacteria and fungi, and against plant-pathogenic nematodes, of which the following orders may, for example, be mentioned.

Aphelenchoides, for example *Aphelenchus ritzemabosi, Aphelenchus fragariae, Aphelenchus oryzae*, Ditylenchoides, for example *Ditylenchus dipsaci*, Meloidogyne, for example *Meloidogyne areanaria, Meloidogyne incognita*, cyst-forming nematodes (Heterodera), for example *Heterodera rostochiensis, Heterodera schachtii*, and root nematodes such as Pratylenchus, Paratylenchus, Rotylenchus, Xiphinema and Rhadopholus.

A further very important advantage of the compounds of the present invention resides in the low toxicity to warm-blooded animals, which in part is over 600 mg. of active substance/kg. of body weight (toxicity to rats, $LD_{50}$, measured by oral administration).

The present invention also provides a pesticidal preparation comprising as the active ingredients at least one phosphonic acid ester of the general formula $$\begin{array}{c} R_1O \\ \phantom{R_2O}\diagdown \\ \phantom{R_2O}P-CH-C(Y)_3 \quad OR_3 \\ R_2O\diagup \phantom{|}\|\phantom{|} \phantom{|}|\phantom{xx}\diagup \\ \phantom{R_2Oxx}O \phantom{x}O-C-NH-P \\ \phantom{R_2Oxxxxxxxx}\|\phantom{xxx}\|\diagdown \\ \phantom{R_2Oxxxxxxxx}O \phantom{xxx}X\phantom{x}OR_4 \end{array} \quad (I)$$

wherein $R_1$, $R_2$, $R_3$, $R_4$, X and Y have the meanings given above in combination with one or more solvents, diluents, dispersing agents, adhesives or binders or a mixture of two or more of these and optionally one or more other pesticides, for example insecticides, acaricides, nematocides, bactericides or fungicides.

The compounds of the present invention may be used, for example, in the form of sprays, concentrates, dusting powders, sprinkling agents, granules, fly plates or impregnated strips containing the active substance.

In order to manufacture directly sprayable solutions of the compounds of the Formula I there may be used as solvent, for example, mineral oil fractions of high to medium boiling range, for example diesel oil or kerosene, coal tar oil and oils of vegetable or animal origin, hydrocarbons, for example alkylated naphthalenes or tetrahydronaphthalene, optionally using xylene mixtures, cyclohexanols, ketones and also chlorinated hydrocarbons, such as trichlorethane, trichlorethylene or trichlorobenzenes and tetrachlorobenzenes. Organic solvents of boiling point above 100° C. are advantageously used.

Aqueous application forms are advantageously prepared by adding water to emulsion concentrates, pastes or wettable spraying powders. As emulsifiers or dispersing agents there may be especially mentioned non-ionic products, for example condensation products of aliphatic alcohols, mercaptans, amines or carboxylic acids having a long-chain hydrocarbon radical containing from about 10 to 20 carbon atoms with ethylene oxide, for example the condensation product of octadecyl alcohol and 25 to 30 mols of ethylene oxide, that of technical oleylamine and 15 mols of ethylene oxide or that of dodecylmercaptan and 12 mols of ethylene oxide. As anionic emulsifiers there may be mentioned, for example, the sodium salt of dodecyl alcohol sulphuric acid ester, the sodium salt of dodecylbenzenesulphonic acid, the potassium or triethanolamine salt of oleic acid or of abietic acid or of mixtures of these acids and the sodium salt of a petroleum-sulphonic acid. As cationic dispersing agents there may be mentioned, for example, quaternary ammonium compounds, for example cetylpyridinium bromide and dihydroxyethylbenzyldodecylammonium chloride.

In order to manufacture dusting agents and sprinkling agents, talc, kaolin, bentonite, calcium carbonate, calcium phosphate, charcoal, cork powder, wood flour or other materials of vegetable origin, for example, may be employed in conjunction with the active ingredient.

Granules may be manufactured, for example, by dissolving an active substance of Formula I in an organic solvent and applying the solution thus obtained to a granular mineral, for example attapulgite, $SiO_2$, granicalcium or bentonite and then evaporating off the organic solvent.

It is also possible to use polymer granules. They may be manufactured, for example, by mixing an active substance of Formula I with polymerisable compounds, for example urea/formaldehyde, dicyandiamide/formaldehyde melamine/formaldehyde, after which a mild polymerisation is carried out, which leaves the active substances unaffected, the granulation being carried out whilst the gel formation is still proceeding. A more advantageous method is to impregnate finished, porous polymer granules, made of, for example, urea/formaldehyde, polyacrylonitrile or polyesters having a certain surface area and a favourable predeterminable adsorption/desorption ratio, with the active substance, for example in the form of a solution (for example in a low-boiling solvent) and subsequently to remove the solvent. Such polymer granules may be applied in the form of micro-granules with bulk densities of preferably 300 g./litre to 600 g./litre, also by means of sprays. The spraying may be carried out over extensive areas of crop plant cultures with, for example, the aid of aircraft.

Further pesticides, fertilisers, surface-active agents or substances for increasing the specific gravity for example $BaSO_4$, may, if desired, be added to the granules.

Granules may also be obtained by compacting the carrier material with the active substance and, if present, further additives, with subsequent comminution.

The various pesticidal preparations may be provided, in the customary manner, with additives which improve the distribution, the adhesion, the rain resistance or the penetrating power. Fatty acids, resin, glue, casein and alginates may be mentioned as examples of such substances.

In general the pesticidal preparations contain from 0.01 to 95 percent, preferably 0.1 to 80 percent, by weight of the active substance. In certain special fields of use, for example in the case of applications from aircraft, a commercially pure active substance may also be employed.

The compounds of the present invention may be combined with known insecticidal, acaricidal and/or nematocidal active substances in order to broaden the spectrum of action, and of these substances the following, for example, may be mentioned:

PHOSPHORIC ACID DERIVATIVES

Bis-o,o-diethylphosphoric acid anhydride (Tepp)
O,O,O,O-tetrapropyldithiopyrophosphate
Dimethyl(2,2,2-trichloro-1-hydroxyethyl)phosphonate (Trichrorfon)
1,2-dibromo-2,2-dichlorethyldimethylphosphate (Naled)
2,2-dichlorovinyldimethylphosphate (Dichlorfos)
2-methoxycarbamyl-1-methylvinyldimethylphosphate (Mevinphos)
Dimethyl-1-methyl-2-(methylcarbamoyl)vinylphosphate cis (Monocrotophos)
3-(dimethoxyphosphinyloxy)-N-methyl-N-methoxy-cis-crotonamide
3-(dimethoxyphosphinyloxy)-N,N-dimethyl-cis-crotonamide (Dicrotophos)
2-chloro-2-diethylcarbamoyl-1-methylvinyldimethylphosphate (Phosphamidon)
O,O-diethyl-O-2-(ethylthio)-ethylthiophosphate (Demeton)
O,O-diethyl-S-2-(ethylthio)-ethylthiophosphate
S-ethylthioethyl-O,O-dimethyl-dithiophosphate (Thiometon)
O,O-diethyl-S-ethylmercaptomethyldithiophosphate (Phorate)
O,O-diethyl-S-2-[(ethylthio)ethyl]dithiophosphate (Disulfoton)
O,O-dimethyl-S-2-(ethylsulphinyl)ethylthiophosphate (Oxydemetonmethyl)
O,O-dimethyl-S-(1,2-dicarbethoxyethyl)dithiophosphate (Malathion)
(O,O,O,O-tetraethyl-S-S'-methylene-bis-[dithiophosphate] (Ethion)
O-ethyl-S,S-dipropyldithiophosphate
O,O-dimethyl-S-(N-methyl-N-formylcarbamoylmethyl)-dithiophosphate (Formotion)
O,O-dimethyl-S-(N-methylcarbamoylmethyl)dithiophosphate (Dimethat)
O,O-dimethyl-S-(N-ethylcarbamoylmethyl)dithiophosphate (Ethoatmethyl)
O,O-diethyl-S-(N-isopropylcarbamoylmethyl)-thiophosphate (Prothoat)
S-N-(1-cyano-1-methylethyl)carbamoylmethyldiethylthiolphosphate (Cyanthoat)
S-(2-acetamidoethyl)-O,O-dimethyldithiophosphate
Hexamethylphosphoric acid triamide (Hempa)
O,O-dimethyl-O-p-nitrophenylthiophosphate (Parathion-methyl)
O,O-diethyl-O-p-nitrophenylthiophosphate (Parathion)
O-ethyl-O-p-nitrophenylthiophosphonate (Epn)
O,O-dimethyl-O-(4-nitro-m-tolyl)thiophosphate (Fenitrothion)
O,O-dimethyl-O-(2-chloro-4-nitrophenyl)thiophosphate (Dicapthon)
O,O-dimethyl-O-p-cyanophenylthiophosphate (Cyanox)
O-ethyl-O-p-cyanophenylphenylthiophosphonate
O-O-diethyl-O-2,4-dichlorophenylthiophosphate (Dichrofenthion)
O-2,4-dichlorophenyl-O-methylisopropylamidothiophosphate
O,O-dimethyl-O-2,4,5-trichlorophenylthiophosphate (Ronnel)
O-ethyl-O-2,4,5-trichlorophenylethylthiophosphonate (Trichloronat)
O,O-dimethyl-O-2,5-dichloro-4-bromophenylthiophosphate (Bromophos)
O,O-diethyl-O-2,5-dichloro-4-bromophenylthiophosphate (Bromophos-ethyl)
O,O-dimethyl-O-(2,5-dichlor-4-iodophenyl)-thiophosphate (Iodofenphos)
4-tert. butyl-2-chlorophenyl-N-methyl-O-methylamidophosphate (Crufomat)
Dimethyl-p-(methylthio)-phenylphosphate
O,O-dimethyl-O-(3-methyl-4-methylmercaptophenyl) thiophosphate (Fenthion)
Isopropylamino-O-ethyl-O-(4-methylmercapto-3-methylphenyl)phosphate
O,O-diethyl-O-p-[(methylsulphinyl)phenyl]-thiophosphate (Fensulfothion)

O,O-dimethyl-O-p-sulphamidophenylthiophosphate
O-[p-(dimethylsulphamido)phenyl]O,O-dimethylthiophosphate (Famphur)
O,O,O',O'-tetramethyl-O,O'-thiodi-p-phenylenethiophosphate
O-(p-(p-chlorophenylazophenyl)O,O-dimethylthiophosphate (Azothoat)
O-ethyl-S-phenyl-ethyldithiophosphonate
O-ethyl-S-4-chlorophenyl-ethyldithiophosphonate
O-isobutyl-S-p-chlorophenyl-ethyldithiophosphonate
O,O-dimethyl-S-p-chlorophenylthiophosphonate
O,O-dimethyl-S-(p-chlorophenylthiomethyl)-dithiophosphate
O,O-diethyl-p-chlorophenylmercaptomethyl-dithiophosphate (Carbophenothion)
O,O-diethyl-S-p-chlorophenylthiomethyl-thiophosphate
O,O-dimethyl-S-(carbethoxy-phenylmethyl)dithiophosphate (Phenothoat)
O,O-diethyl-S-(carbofluorethoxy-phenylmethyl)-dithiophosphate
O,O-dimethyl-S-(carbisopropoxy-phenylmethyl)-dithiophosphate
O,O-dimethyl-O-(alpha-methylbenzyl-3-hydroxycrotonyl)phosphate
2-chloro-1-(2,4-dichlorophenyl)vinyl-diethylphosphate (Chlorfenvinphos)
2-chloro-1-(2,4,5-trichlorophenyl)vinyl-dimethylphosphate
O-(2-chloro-1-(2,5-dichlorophenyl)vinyl-O,O-diethylthiophosphate
Phenylglyoxylonitriloxime-O,O-diethylthiophosphate (Phoxim)
O,O-diethyl-O-(3-chloro-4-methyl-2-oxo-2-H-1-benzopyran-7-yl)-thiophosphate (Coumaphos)
O,O-diethyl-7-hydroxy-3,4-tetramethylene-coumarinyl-thiophosphate (Coumithoat)
2,3-p-dioxanedithiol-S,S-bis(O,O-diethyldithiophosphate) (Dioxathion)
2-methoxy-4-H-1,3,2-benzodioxaphosphorine-2-sulphide
O,O-diethyl-O-(5-phenyl-3-isooxyzolyl (sic)) thiophosphate
S-[(6-chloro-2-oxo-3-benzoxazolinyl)methyl]O,O-diethyldithiophosphate (Phosalon)
2-(diethoxyphosphinylimino)-4-methyl-2,3-dithiolane
O,O-dimethyl-S-[2-methoxy-1,3,4-thiadiazol-5-(4H)-onyl-(4)-methyl]dithiophosphate
Tris-(2-methyl-1-aziridinyl)-phosphine-oxide (Metepa)
O,O-dimethyl-S-phthalimidomethyl-dithiophosphate
S-(2-chloro-1-phthalimidoethyl)-O,O-diethyldithiophosphate
N-hydroxynaphthalimido-diethylphosphate
Dimethyl-3,5,6-trichloro-2-pyridylphosphate
O,O-dimethyl-O-(3,5,6-trichloro-2-pyridyl)thiophosphate
O,O-diethyl-O-(3,5,6-trichloro-2-pyridyl)thiophosphate
O,O-diethyl-O-2-pyrazinylthiophosphate (Thionazin)
O,O-diethyl-O-(2-isopropyl-4-methyl-6-pyrimidyl) thiophosphate (Diazinon)
O,O-diethyl-O-(2-quinoxylyl)thiophosphate
O,O-dimethyl-S-(4-oxo-1,2,3-benzotriazin-3(4H)-ylmethyl)dithiophosphate (Azinphosmethyl)
O,O-diethyl-S-(4-oxo-1,2,3-benzotriazin-3(4H)-ylmethyl)-dithiophosphate (Azinphosethyl)
S-[(4,6-diamino-s-triazin-2-yl)methyl]-O,O-dimethyldithiophosphate (Menazon)
S-[2-(ethylsulphonyl)ethyl]dimethylthiolphosphate (Dioxydemeton-s-methyl)
Diethyl-S-[2-ethylsulphinyl)ethyl]dithiophosphate (Oxydisulfoton)
Bis-O,O-diethylthiophosphoric acid anhydride (Sulfotep)
Dimethyl-1,3-di(carbomethoxy)-1-propen-2-yl-phosphate
Dimethyl-(2,2,2-trichloro-1-butyroyloxyethyl) phosphonate (Butonat)
O,O-dimethyl-O-(2,2-dichloro-1-methoxy-vinyl)phosphate
O,O-dimethyl-O-(3-chloro-4-nitrophenyl)thiophosphate (Chlorthion)

O,O-dimethyl-O(or S)-2-(ethylthioethyl)thiophosphate (Demeton-s-methyl)
Bis-(dimethylamido)fluorophosphate (Dimefox)
2-(O,O-dimethyl-phosphoryl-thiomethyl)-5-methoxy-pyrone-4
3,4-dichlorobenzyl-triphenylphosphonium chloride
Dimethyl-N-methoxymethylcarbamoylmethyl-dithiophosphate (Formocarbam)
O,O-diethyl-O-(2,2-dichloro-1-chlorethoxyvinyl) phosphate
O,O-dimethyl-O-(2,2-dichloro-1-chlorethoxyvinyl) phosphate
O-ethyl-S,S-diphenyldithiolphosphate
O-ethyl-S-benzyl-phenyldithiophosphonate
O,O-diethyl-S-benzyl-thiolphosphate
O,O-dimethyl-S-(4-chlorophenylthiomethyl) dithiophosphate (Methylcarbophenothion)
O,O-dimethyl-S-(ethylthiomethyl)dithiophosphate
Diisopropylaminofluorophosphate (Mipafox)
O,O-dimethyl-S-(morpholinylcarbamoylmethyl)dithiophosphate (Morphothion)
Bismethylamido-phenylphosphate
O,O-dimethyl-S-(benzenesulphonyl)dithiophosphate
O,O-dimethyl-(S and O)-ethylsulphinylethylthiophosphate
O,O-diethyl-O-4-nitrophenylphosphate
O,O-diethyl-S-(2,5-dichlorophenylthiomethyl)dithiophosphate (Phendapton)
Triethoxy-isopropoxy-bis(thiophosphinyl)disulphide
O,O-diethyl-O-(4-methyl-coumarinyl-7)-thiophosphate (Potasan)
2-methoxy-4H-1,3,2-benzodioxaphosphorine-2-oxide
Octamethylpyrophosphoramide (Schradan)
Bis(dimethoxythiophosphinylsulphido)-phenylmethane
5-amino-bis(dimethylamido)phosphinyl-3-phenyl-1,2,4-triazole (Triamiphos)
N-methyl-5-(O,O-dimethylthiolphosphoryl)-3-thiavaleramide (Vamidothion)

CARBAMIC ACID DERIVATIVES 1-naphthyl-N-methylcarbamate (Carbaryl)
2-butinyl-4-chlorophenylcarbamate
4-dimethylamino-3,5-xylyl-N-methylcarbamate
4-dimethylamino-3-tolyl-N-methylcarbamate (Aminocarb)
4-methylthio-3,5-xylyl-N-methylcarbamate (Methiocarb)
3,4,5-trimethylphenyl-N-methylcarbamate
2-chlorophenyl-N-methylcarbamate (Cpmc)
5-(chlor-6-oxo-2-norbornane-carbonitrile-O-(methylcarbamoyl)-oxime
1-(dimethylcarbamoyl)-5-methyl-3-pyrazolyl-N,N-dimethylcarbamate (Dimetilan)
2,3-dihydro-2,2-dimethyl-7-benzofuranyl-N-methylcarbamate (Carbofuran)
2-methyl-2-methylthio-propionaldehyde-O-(methylcarbamoyl)-oxime (Aldicarb)
8-quinaldyl-N-methylcarbamate and its salts
Methyl 2-isopropyl-4-(methylcarbamoyloxy)carbanilate
m-(1-ethylpropyl)phenyl-N-methylcarbamate
3,5-di-tert.butyl-N-methylcarbamate
m-(1-methylbutyl)phenyl-N-methylcarbamate
2-isopropylphenyl-N-methylcarbamate
2-sec.butylphenyl-N-methylcarbamate
m-tolyl-N-methylcarbamate
2,3-xylyl-N-methylcarbamate
3-isopropylphenyl-N-methylcarbamate
3-tert.butylphenyl-N-methylcarbamate
3-sec.-butylphenyl-N-methylcarbamate
3-isopropyl-5-methylphenyl-N-methylcarbamate (Promecarb)
3,5-diisopropylphenyl-N-methylcarbamate
2-chlor-5-isopropylphenyl-N-methylcarbamate
2-chlor-4,5-dimethylphenyl-N-methylcarbamate
2-(1,3-dioxolan-2-yl)phenyl-N-methylcarbamate (Dioxycarb)

2-(4,5-dimethyl-1,3-dioxolan-2-yl)phenyl-N-methylcarbamate
2-(1,3-dioxan-2-yl)phenyl-N-methylcarbamate
2-(1,3-dithiolan-2-yl)phenyl-N-methylcarbamate
2-(1,3-dithiolan-2-yl)phenyl-N,N-dimethylcarbamate
2-isopropoxyphenyl-N-methylcarbamate (Arprocarb)
2-(2-propinyloxy)phenyl-N-methylcarbamate
2-(2-propinyloxy)phenyl-N-methylcarbamate
3-(2-propinyloxy)phenyl-N-methylcarbamate
2-dimethylaminophenyl-N-methylcarbamate
2-(diallylaminophenyl-N-methylcarbamate
4-diallylamino-3,5-xylyl-N-methylcarbamate (Allyxicarb)
4-benzothienyl-N-methylcarbamate
2,3-dihydro-2-methyl-7-benzofuranyl-N-methylcarbamate
3-methyl-1-phenylpyrazol-5-yl-N,N-dimethylcarbamate
1-isopropyl-3-methylpyrazol-5-yl-N,N-dimethylcarbamate (Isolan)
2-(N′,N′-dimethylcarbamoyl)-3-methylpyrazol-5-yl-N,N-dimethylcarbamate
2-dimethylamino-5,6-dimethylpyrimidin-4-yl-N,N-dimethylcarbamate
3-methyl-4-dimethylaminomethyleneiminophenyl-N-methylcarbamate
3-dimethylamino-methyleneiminophenyl-N-methylcarbamate
1-methylthio-ethylimino-N-methylcarbamate (Methoxymyl)
2-methylcarbamoyloxyimino-1,3-dithiolane
5-methyl-2-methylcarbamoyloxyimino-1,3-oxathiolane
2-(1-methoxy-2-propoxy)phenyl-N-methylcarbamate
2-(1-butin-3-yl-oxy)phenyl-N-methylcarbamate
3-methyl-4-(dimethylamino-methylmercapto-methyleneimino)phenyl-N-methylcarbamate
1,3-bis(carbamoylthio)-2-(N,N-dimethylamino)-propane hydrochloride
5,5-dimethylhydroresorcinoldimethylcarbamate
2-[propargylethylamino]-phenyl-N-methylcarbamate
2-[propargylmethylamino]-phenyl-N-methylcarbamate
2-[dipropargylamino]-phenyl-N-methylcarbamate
3-methyl-4-[dipropargylamino]-phenyl-N-methylcarbamate
3,5-dimethyl-4-[dipropargylamino]-phenyl-N-methylcarbamate
2-[allyl-isopropylamino]-phenyl-N-methylcarbamate and
3-[allyl-isopropylamino]-phenyl-N-methylcarbamate.

CHLORINATED HYDROCARBONS

γ-Hexachlorocyclohexane [Gammexane; Lindane; γ HCH]
1,2,4,5,6,7,8,8-Octachloro-3α,4,7,7α′-tetrahydro-4,7-methyleneindane [Chlordan]
1,4,5,6,7,8,8-heptachloro-3α,4,7,7α-tetrahydro-4,7-methyleneindane [Heptachlor]
1,2,3,4,10,10-hexachloro-1,4,4α,5,8,8α-hexahydro-endo-1,4-exo-5,8-dimethanonaphthalene [Aldrin]
1,2,3,4,10,10-hexachlor-6,7-epoxy-1,4,4α,5,6,7,8,8α-9-octahydro-exo-1,4-endo-5,8-dimethanonaphthalene [Dieldrin]ditto, endo-endo- [Endrin]
6,7,8,9,10,10-hexachloro-1,5,5α,6,9,9α-hexahydro-6,9-methano-2,3,4 benzo[e]-dioxa-thiepene-3-oxide [Endosulfan]
Chlorinated camphor [Toxaphen]
Decachloroctahydro-1,3,4-metheno-2H-cyclobuta[e,d]pentalen-2-one
Dodecachloroctahydro-1,3,4-metheno-1H-cyclobuta-[c,d]pentalene [Mirex]
Ethyl-1,1α,3,3α,4,5,5,5α,5α,6-decachloroctahydro-2-hydroxy-1,3,4-metheno-1H-cyclobuta[c,d]pentalene-2-levulinate
Bis(pentachloro-2,4-cyclopentadiene-1-yl)
Dinoctone-o
1,1,1-trichloro-2,2-bis(p-chlorophenyl)ether [DDT]
Dichlorodiphenyl-dichlorethane [TDE]
Di(p-chlorophenyl)-trichloromethylcarbinol [Dicofol]
Ethyl-4,4′-dichlorophenylglycollate [Chlorobenzylate]
Ethyl-4,4′-dibromobenzylate [Bromobenzylate]
Isopropyl-4,4′-dichlorobenzylate
1,1,1-trichloro-2,2-bis(p-methoxyphenyl)ethane [Methoxychlor]
Diethyl-diphenyl-dichlorethane
Decachloropentacyclo(3,3,2,O$^{2,6}$, O$^{3,9}$, O$^{7,10}$)decan-4-one [Chlordecon].

NITROPHENOLS AND DERIVATIVES 4,6-dinitro-6-methylphenol Na salt [dinitrocresol]
Dinitrobutylphenol-2,2′,2″-triethanolamine salt
2-cyclohexyl-4,6-dinitrophenol [Dinex]
2-(1-methylheptyl)-4,6-dinitrophenyl-crotonate [Dinocap]
2 sec.-butyl-4,6-dinitrophenyl-3-methyl-butenoate [Binapacryl]
2 sec.-butyl-4,6-dinitrophenyl-cyclopropionate and
2 sec.-butyl-4,6-dinitrophenyl-isopropyl-carbonate [Dinobuton]

VARIOUS SUBSTANCES

Sabadilla
Rotenon
Cevadin
Veratridin
Ryania
Pyrethrin
3-allyl-2-methyl-4-oxo-2-cyclopenten-1-yl-chrysanthemumate (Allethrin)
6-chloropiperonyl-chrysanthemumate (Barthrin)
2,4-dimethylbenzyl-chrysanthemumate (Dimethrin)
2,3,4,5-tetrahydrophthalimidomethyl-chrysanthemumate
(5-benzyl-3-furyl)-methyl-2,2-dimethyl-3-(2-methylpropanyl) cyclopropanecarboxylate
Nicotine
Bacillus thuringiensis Berliner
Dicyclohexylcarbodiimide
Diphenyldiimide [azobenzene (sic)]
4-chlorobenzyl-4-chlorophenylsulphide [Chlorbensid]
Creosote oil
6-methyl-2-oxo-1,3-dithiolox[4,5-b]-quinoxaline [Quinomethionat]
(I)-3-(2-furfuryl)-2-methyl-4-oxocyclopent-2-enyl(I)-(cis+. trans)chrysanthemum-monocarboxylate [Furethrin]
2-pivaloyl-indane-1,3-dione [Pindon]
2-fluoroethyl(4-bisphenyl)acetate
2-fluoro-N-methyl-N(1-naphthyl)-acetamide
Pentachlorophenol and salts
2,2,2-trichloro-N-(pentachlorophenyl)-acetimidoyl chloride
N′-(4-chloro-2-methylphenyl)-N,N-dimethylformamidine (Chlorphenamidine)
4-chlorobenzyl-4-fluorophenyl-sulphide (Fluorobenside)
5,6-dichloro-1-phenoxycarbanyl-2-trifluoromethyl-benzimidazole-tin hydroxide
Tricyclohexyl-tin hydroxide
2-thiocyanatoethyl-lauric acid ester
β-butoxy-β′-thiocyanatodiethyl-ether
Isobornyl-thiocyanatoacetate
p-Chlorophenyl-p-chlorobenzenesulphonate (Ovex)
2,4-dichlorophenyl-benezenesulphonate
p-Chlorophenyl-benzenesulphonate (Fenson)
p-Chlorophenyl-2,4,5-trichlorophenylsulphone (Tetradifon)
p-Chlorophenyl-2,4,5-trichlorophenylsulphide (Tetrasul)
Methyl bromide
p-Chlorophenyl-phenylsulphone
p-Chlorobenzyl-p-chlorophenylsulphide (Chlorobenside)
4-chlorophenyl-2,4,5-trichlorophenylazosulphide
2(p-tert.-butylphenoxy-1-methylethyl-2-chlorethyl-sulphite
2(p-tert.-butylphenoxy)cyclohexyl-2-propinyl-sulphite
4,4′-dichloro-N-methylbenzenesulphonanilide N-(2-fluoro-1,1,2,2-tetrachlorethylthio)-methanesulphon-anilide 2-thio-1,3-dithiolo-(4,5,6)quinoxaline (Thioquinox)

Chloromethyl-p-chlorophenylsulphone (lauseto (sic) new)

1,3,6,8-tetranitrocarbazole and

Prop-2-ynyl-(4-t-butylphenoxy)-cyclohexylsulphite (Propargil).

The action of the phosphonic acid esters according to the present invention may be increased by synergistic agents. Sesamin, Sesamex, piperonyl-cyclonene, piperonylbutoxide, piperonal - bis[2 - (2 - butoxyethoxy)ethyl] acetate, sulphoxides, propyl-isome, N - 2 - ethylhexyl)-5-norbornene - 2,3 - dicarboxamide, octachlorodipropyl-ether, 2 - nitrophenyl - propargyl - ether, 4 - chloro - 2 - nitrophenyl - propargyl - ether and 2,4,5 - trichlorophenyl-propargyl - ether are, for example, suitable for this purpose.

The present invention also provides a process for the manufacture of a phosphonic acid ester of the general Formula I which comprises reacting a phosphonic acid ester of formula

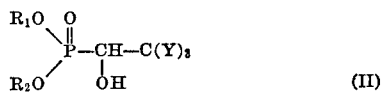

with an O,O-dialkylphosphonyl-isocyanate of formula

wherein, in the Formulae II and III, $R_1$, $R_2$, $R_3$, $R_4$, Y and X have the meaning given above.

The reaction of (II) and (III) is preferably carried out in a solvent which is free of hydroxyl groups, for example in benzene, toluene, dioxan or methyl-ethyl-ketone.

The following examples illustrate the invention:

EXAMPLE 1

Manufacture of

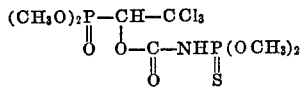

[Active substance No. 1]

Toxicity of rats, when administered orally: $LD_{50}=650$ mg. of active substance/kg. body weight 25 g. of O,O-dimethylthiophosphonyl-isocyanate were added dropwise, with stirring, to a mixture of 38.5 g. of 2,2,2-trichloro-1 - hydroxyethylphosphonic acid dimethyl ester and 150 ml. of benzene. The reaction mixture was then stirred for 5 hours at 60° C. After cooling, the reaction mixture was filtered and the solvent was distilled from the filtrate. The crude product was recrystallised from benzene-hexane.

Yield: 57.6 g. Melting point: 120° C.

Analysis.—Calculated for $C_7H_{14}Cl_3NO_7P_2S$ (percent): P, 14.6; N, 3.3. Found (percent): P, 14.3; N, 3.3.

Following the same method, 33.9 g. of 2,2,2-trichloro-1-hydroxyethylphosphonic acid dimethyl ester and 23.3 g. of diethylphosphonyl-isocyanate yielded the compound of the formula

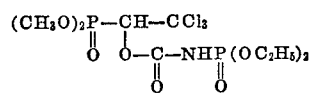

[Active substance No. 2]

Toxicity to rats, when administered orally: $LS_{50}=215$ mg. of active substance/kg. body weight as a very viscous dark liquid which could not be distilled.

Analysis.—Calculated for $C_9H_{18}Cl_3NO_8P_2$ (percent): P, 14.2; N, 3.2; Cl, 24.4. Found (percent): P, 14.3; N, 3.2; Cl, 23.9.

The following esters can be manufactured in a similar manner to that described above:

| Active substance No. | $R_1=R_2$ | $R_3=R_4$ | Y | X | Property |
|---|---|---|---|---|---|
| 3 | $CH_3$ | $CH_3$ | Cl | O | Dark viscous oil. |
| 4 | $CH_3$ | $C_2H_5$ | Cl | S | Oil. |
| 5 | $CH_3$ | $i-C_3H_7$ | Cl | O | Viscous oil. |

EXAMPLE 2

Dusting agents

Equal parts of an active substance according to the invention and of precipitated silica are finely ground. Dusting agents, preferably containing 1–6% of active substance, can be manufactured therefrom by mixing with kaolin or talc.

Spraying powders

In order to manufacture a spraying powder, the following components are mixed and finely ground:

50 parts of active substance according to the present invention 20 parts of Hisil (highly adsorbent silica)

25 parts of Bolus alba (kaolin)

3.5 parts of a reaction product of p-tert.octylphenol and ethylene oxide and 1.5 parts of sodium 1-benzyl-2-stearyl-benzimidazole-6,3'-disulphonate.

Emulsion concentrate

Easily soluble active substances can also be formulated as an emulsion concentrate in accordance with the following instruction:

20 parts of active substance, 70 parts of xylene, and 10 parts of a mixture of a reaction product of an alkyl phenol with ethylene oxide and calcium dodecylbenzenesulphonate are mixed. On dilution with water to the desired concentration, a sprayable emulsion results.

Granules (a) 7.5 g. of one of the active substances of Formula I are dissolved in 100 ml. of acetone and the acetone solution thus obtained is added to 92 g. of granular attapulgite (mesh size 24/48 meshes/inch). The whole is well mixed and the solvent is stripped off in a rotary evaporator. Granules containing 7.5% of active substance are obtained.

(b) To manufacture 10% strength polymer granules, 1050 to 1100 g. of technical active substance of the Formula I are dissolved in 2 litres of trichlorethylene and sprayed in a fluidised bed granulator at 1.5 atmospheres gauge spraying pressure, onto 9230 g. of initially introduced porous urea/HCHO granules. The solvent can be removed again by heating the fluidising air to approx. 50° C.

(c) To manufacture 7.5% strength weighted granules, 770 g. of a solid technical active substance of the Formula I, 500 g. $BaSO_4$, 1000 g. of urea and 7730 g. of powdered, porous polyacrylonitrile are pressed on a roll mill and subsequently crushed to the desired particle size.

EXAMPLE 3

Contact action on *Musca domestica* (L.) and *Ceratitis capitata*

1 half each of a series of Petri dishes were each treated with 1 ml. of an acetone solution of one of substances No. 1 and No. 2 containing 1000, 100, 10.5, 2.5 and 1.25 p.p.m. of the active substance. After evaporation of the solvent, 10 supercooled house flies were introduced into each of the prepared Petri dishes, and the lid halves were put into place. After increasing time intervals, the mortality was checked at the various concentrations. The following mortality in percent was achieved after 4 hours:

ACTIVE SUBSTANCE NO. 1

| Concentration (p.p.m.) | Musca domestica | Ceratitis capatita |
|---|---|---|
| 1,000 | 100 | 100 |
| 100 | 50 | 100 |
| 10 | 100 | 50 |
| 5 | 50 | 0 |
| 2.5 | 50 | 50 |
| 1.25 | 0 | 0 |

ACTIVE SUBSTANCE NO. 2

| Concentration (p.p.m.) | Musca domestica | Ceratitis capitata |
|---|---|---|
| 1,000 | 100 | 100 |
| 100 | 100 | 100 |
| 10 | 100 | 100 |
| 5 | 100 | 100 |
| 2.5 | 100 | 100 |
| 1.25 | 50 | 100 |

EXAMPLE 4

Action against *Prodenia litura* larvae 5 larvae at a time, in the L-2 stage are placed on a leaf of Malva silvestris which has previously been dipped into an aqueous solution of an active substance and thereafter been placed in a covered Petri dish, with the atmospheric moisture in the dish being maintained by a moistened cottonwool pad. In this contact and ingestion test, the action is tested after 1 day.

The following result was obtained:

| Compound No. | Concentration (p.p.m.) | Percent mortality |
|---|---|---|
| 1 | 800 | 100 |
|   | 400 | 100 |
|   | 200 | 0 |
| 2 | 800 | 100 |
|   | 400 | 100 |
|   | 200 | 100 |
|   | 100 | 80 |

EXAMPLE 5

(a) The test with *Epilachna varivestis*, the Mexican bean beetle, was carried out as follows: 4-5 seedlings of *Phaseolus vulgaris*, in the primary leaf stage, grown in a flower pot, were dipped into emulsions of the experimental preparation and subsequently allowed to dry. The test animals, L-4 stages of the beetle, were introduced into a cellophane bag, which was subsequently fixed over the treated plant by means of a rubber band. After 5 days the action of the treatment is determined by counting the live and dead animals and by calculating the percentage mortality.

With compound No. 1, the following result was achieved:

Concentration [p.p.m.]: Mortality percent
800 ---------------------------- 100
400 ---------------------------- 100
200 ---------------------------- 60

(b) The test with *Orgyia gonostigma* in the L-3 stage was carried out analogously, with young mallows as the host plant. 5 larvae were used for each experiment. With active substance No. 1 and No. 2 the following mortality was achieved after 2 days:

| Compound No. | Concentration (p.p.m.) | Mortality, percent |
|---|---|---|
| 1 | 800 | 100 |
|   | 400 | 80 |
|   | 200 | 60 |
| 2 | 800 | 100 |
|   | 400 | 100 |
|   | 200 | 100 |

We claim:

1. A phosphonic acid ester of the formula $$\begin{array}{c} R_1O \\ \phantom{R_1O}\diagdown \\ \phantom{R_1O}\phantom{O}P-CH-C(Y)_3 \phantom{xx} OR_3 \\ \phantom{xx}\diagup \phantom{x} \| \phantom{xx} | \phantom{xxxxxxx} \diagup \\ R_2O \phantom{x} O \phantom{xx} O-C-NH-P \\ \phantom{xxxxxxxxxxxx} \| \phantom{xxx} \|\diagdown \\ \phantom{xxxxxxxxxxxx} O \phantom{xxx} X \phantom{x} OR_4 \end{array} \quad (I)$$

wherein $R_1$, $R_2$, $R_3$ and $R_4$, which may be the same or different, each represents an alkyl radical containing from 1 to 5 carbon atoms, X represents an oxygen or sulphur atom and Y represents a halogen atom.

2. A phosphonic acid ester derivative according to claim 1, wherein Y represents a fluorine, chlorine or bromine atom.

3. A phosphonic acid ester according to claim 1, wherein $R_1$, $R_2$, $R_3$ and $R_4$, which may be the same or different, each represents a methyl or ethyl group, X represents an oxygen or sulphur atom and Y represents a chlorine or bromine atom.

4. A phosphonic acid ester according to claim 1, wherein $R_1$ is the same as $R_2$ and represents a methyl or ethyl group, and $R_3$ is the same as $R_4$, and represents a methyl or ethyl group.

5. The phosphonic acid ester of the formula $$\begin{array}{c} O \\ \| \\ (CH_3O)_2P-CH-CCl_3 \\ \phantom{xxxxxxx} | \\ \phantom{xxxxxxx} O-C-NH-P(OCH_3)_2 \\ \phantom{xxxxxxxxxxx} \| \phantom{xxxx} \| \\ \phantom{xxxxxxxxxxx} O \phantom{xxxx} S \end{array}$$

according to claim 1.

6. The phosphonic acid ester of the formula $$\begin{array}{c} O \\ \| \\ (CH_3O)_2P-CH-CCl_3 \\ \phantom{xxxxxxx} | \\ \phantom{xxxxxxx} O-C-NH-P(OC_2H_5)_2 \\ \phantom{xxxxxxxxxxx} \| \phantom{xxxx} \| \\ \phantom{xxxxxxxxxxx} O \phantom{xxxx} O \end{array}$$

according to claim 1.

References Cited

UNITED STATES PATENTS 3,365,530  1/1968  Bahr et al. _____ 260—938 X

LEWIS GOTTS, Primary Examiner

A. H. SUTTO, Assistant Examiner

U.S. Cl. X.R.

260—939, 968; 424—204